United States Patent [19]

Barberis

[11] Patent Number: 4,536,039

[45] Date of Patent: Aug. 20, 1985

[54] VEHICLE BRAKING APPARATUS AND METHOD

[75] Inventor: Dario Barberis, Turin, Italy

[73] Assignee: WABCO Westinghouse Compagnia Freni S.p.A., Turin, Italy

[21] Appl. No.: 564,665

[22] Filed: Dec. 23, 1983

[30] Foreign Application Priority Data

Jan. 7, 1983 [IT] Italy ............................. 67013 A/83

[51] Int. Cl.³ ............................................. B60T 15/18
[52] U.S. Cl. ....................................... 303/16; 303/20; 303/22 A
[58] Field of Search .................... 303/3, 15, 16, 17, 20, 303/22 A; 188/151 A, 195

[56] References Cited

U.S. PATENT DOCUMENTS 1,173,673  2/1916  Macloskie ............................. 303/16
3,709,564  1/1973  Jeffrey et al. ...................... 303/22 A
3,716,274  2/1973  Pier ....................................... 303/16

*Primary Examiner*—Douglas C. Butler
*Assistant Examiner*—Alvin Oberley
*Attorney, Agent, or Firm*—J. O. Ray, Jr.

[57] ABSTRACT

A braking apparatus and method are taught that allows the vehicle having the apparatus to resume operation when the magnitude of an electrical signal to an electro-fluidic portion of the apparatus is less than a minimum predetermined value. The system uses electro-fluidic braking equipment to supply pressurized fluid in response to an electrical signal and fluid pressure controlled braking equipment to supply pressurized fluid in response to pressure differentials. An automatic selector value (ASV) normally receives pressurized fluid from the electro-fluidic equipment. When a minimum predetermined value electrical signal is not present, however, the ASV receives pressurized fluid from the fluid pressure controlled braking equipment. The system incorporates a release device to isolate the electro-fluidic braking equipment from the ASV when the electrical signal is less than the minimum predetermined value. Thereafter, the equipment may resume operation.

16 Claims, 3 Drawing Figures

VEHICLE BRAKING APPARATUS AND METHOD

BACKGROUND OF THE INVENTION

This invention relates in general to vehicle braking and, more particularly, to an improved electro-fluidic braking apparatus for a vehicle and to a method of operation of the apparatus that will allow the vehicle to resume operation following a breakdown.

It has been known to use an electro-fluidic braking system in combination with a fluid pressure operated braking means. For example, see U.S. Pat. No. 3,709,564 by Jeffrey et al, incorporated herein by reference. In systems of this type, as used in the railroad industry, an electronic control unit includes circuitry for providing a friction brake control signal in response to which brake control pressure is applied. A pneumatic to electric transducer senses the effective brake control pressure to provide feedback information to the electronic control unit. The frictional brake control signal provides continuous blending of the combined friction and dynamic braking necessary to satisfy the overall effective brake demand signal.

The major problem with this type of system arises when an electrical failure occurs in either the electronic control unit or the electromagnetic transducer valve which controls development of pneumatic pressure in accordance with the output from the electronic control unit. When a failure occurs, an automatic full service brake application is established. To allow a return to service, it has been known to provide a manual changeover valve to convert the brake control system from an electropneumatic to an automatic-pneumatic mode of brake control. In this automatic-pneumatic mode, the variation of brake pipe pressure is effective to render a train operative on a "limp-in" basis to return to the station under control of the friction brake.

However, when this type of system is used on a train and the changeover must be made manually, a delay is imposed, during which time the train is inoperative and consequently may be in danger of being struck by another train. This is especially true where tight operating schedules must be adhered to.

The Jeffrey et al invention sought to overcome the above-described problem by providing a braking system in which a controller device was selectively operative to different control positions by the operator. In the Jeffrey et al system, pneumatic brake pipe pressure is varied in parallel with variation of an electrical signal, the signal employed being an analog P-wire signal. A service brake control valve device is subject to operation in response to a pressure differential across its control piston between brake pipe pressure and a control reservoir pressure. During automatic pneumatic mode of control, control reservoir pressure is maintained constant to serve as a reference against which the brake pipe pressure variation is effective to develop graduated service brake pressure by way of a double check valve device. During normal electropneumatic mode of control, electropneumatic application and release control valves are operative to provide brake pressure by way of the opposite input of the double check valve in response to digital control signals produced by an electronic control unit which is effective to sense the P-wire signal. The dynamic brake effectiveness and a pressure feedback signal corresponding to the effective friction brake produces continuous dynamic/friction brake blending.

In one embodiment of the Jeffrey et al invention, the electropneumatic application control valve controls fluid pressure communication between the control reservoir and a displacement reservoir to which the control chamber of a convention relay valve device is connected; and in a second embodiment, the electropneumatic application control valve controls fluid pressure communication between a source of supply and the control chamber of a conventional on/off type pilot control valve which, in turn, controls fluid pressure communication between control reservoir pressure and brake pipe pressure. In each embodiment, control reservoir pressure is dissipated at least to the value of brake pipe pressure in response to operation of the electropneumatic application valve to thereby nullify the effect of a brake pipe pressure reduction at the service brake control valve. Control reservoir pressure is prevented from reducing with the brake pipe, however, in consequence of the electropneumatic valve failing to respond to a brake application signal for any reason, thereby establishing control reservoir pressure effective to operate the service brake control valve in accordance with reduction of brake pipe pressure threat to provide a back-up brake application under automatic-pneumatic brake control.

In the first-mentioned embodiment, a load control valve, subject to variations in the vehicle load condition, controls the level of fluid pressure to which a supply reservoir is charged. This supply pressure is connected to the relay valve, the maximum output of which is thereby limited in accordance with the vehicle load condition. In the latter embodiment, the load control valve supplies brake pressure directly, thus eliminating the need for a separate relay valve device as provided in the first embodiment.

In contrast to the invention of Jeffrey et al, in applicant's invention, the electropneumatic braking means and the pneumatic braking means are not both operative at the same time.

SUMMARY OF THE INVENTION

The invention disclosed in this application relates to an improved vehicle braking apparatus which will allow resumption of operations when an electrical signal to the electro-fluidic portion of the apparatus is less than a predetermined minimum value. In one embodiment of the invention, electro-fluidic braking equipment is provided to supply pressurized fluid to the brakes of a vehicle in response to an electrical signal. A fluid pressure controlled braking equipment is also provided. The fluid pressure controlled braking equipment supplies pressurized fluid through a distributor valve to the brakes of the vehicle in response to pressure differentials between a brake pipe and the fluid pressure controlled braking equipment. The fluid pressure controlled braking equipment is manually operated. Also provided is an automatic selector valve which receives the pressurized fluid from the electro-fluidic braking equipment when the electrical signal is equal to or greater than a predetermined minimum value. When the electrical signal is less than the predetermined minimum value, the automatic selector valve receives the pressurized fluid from the fluid pressure controlled braking equipment. To accomplish the above, the automatic selector valve has a fluid entry port connected for fluid communication with the electro-fluidic braking equipment and another fluid entry port connected for fluid communication with the fluid pressure controlled braking equipment. A line for communicating fluid pressure to the brakes of the vehicle is connected at one end thereof to a fluid exit port on the automatic selector valve. The other end of the line is connected for fluid communication with the brakes on the vehicle. According to this invention, there is provided a means that releases the brakes on the equipment and also isolates the electro-fluidic braking means from the automatic selector valve when the electrical signal is less than a predetermined minimum value, thus enabling the vehicle to resume operations. This means is connected into the braking apparatus intermediate the automatic selector valve and the electro-fluidic braking equipment.

OBJECTS OF THE INVENTION

It is the primary object of this invention to provide an improved vehicle braking apparatus and method of operation of such equipment that allows resumption of operation when an electrical signal to an electro-fluidic portion of the braking apparatus is less than a predetermined minimum value by providing a means for releasing the brakes and isolating the electrically controlled braking equipment from the apparatus until the electrical signal is equal to or greater than the predetermined minimum value.

Another object of the invention is to provide an improved vehicle braking apparatus and method of operation that does not require the operator of the equipment to leave the operator's station to activate.

A further object of the invention is to provide an improved vehicle braking apparatus wherein once the brakes have been released and the electro-fluidic braking equipment has been isolated from the system, the system can then be locked in this position until the electrical signal to the electro-fluidic equipment is equal to or greater than a predetermined minimum value.

Still another object of the invention is to provide an improved vehicle braking apparatus and method of operation wherein a warning signal is provided to the operator that the electro-fluidic portion of the apparatus has been isolated.

Yet another object of the invention is to provide an improved vehicle braking apparatus wherein the means to release the brakes and to isolate the electro-fluidic braking means from the system can be actuated either by fluid pressure or electrically.

These and various other objects and advantages of the invention will become more apparent to those skilled in the art from the following detailed description when taken in conjunction with the attached drawings.

DESCRIPTION OF THE PREFERRED AND ALTERNATIVE EMBODIMENTS

Figure 1:
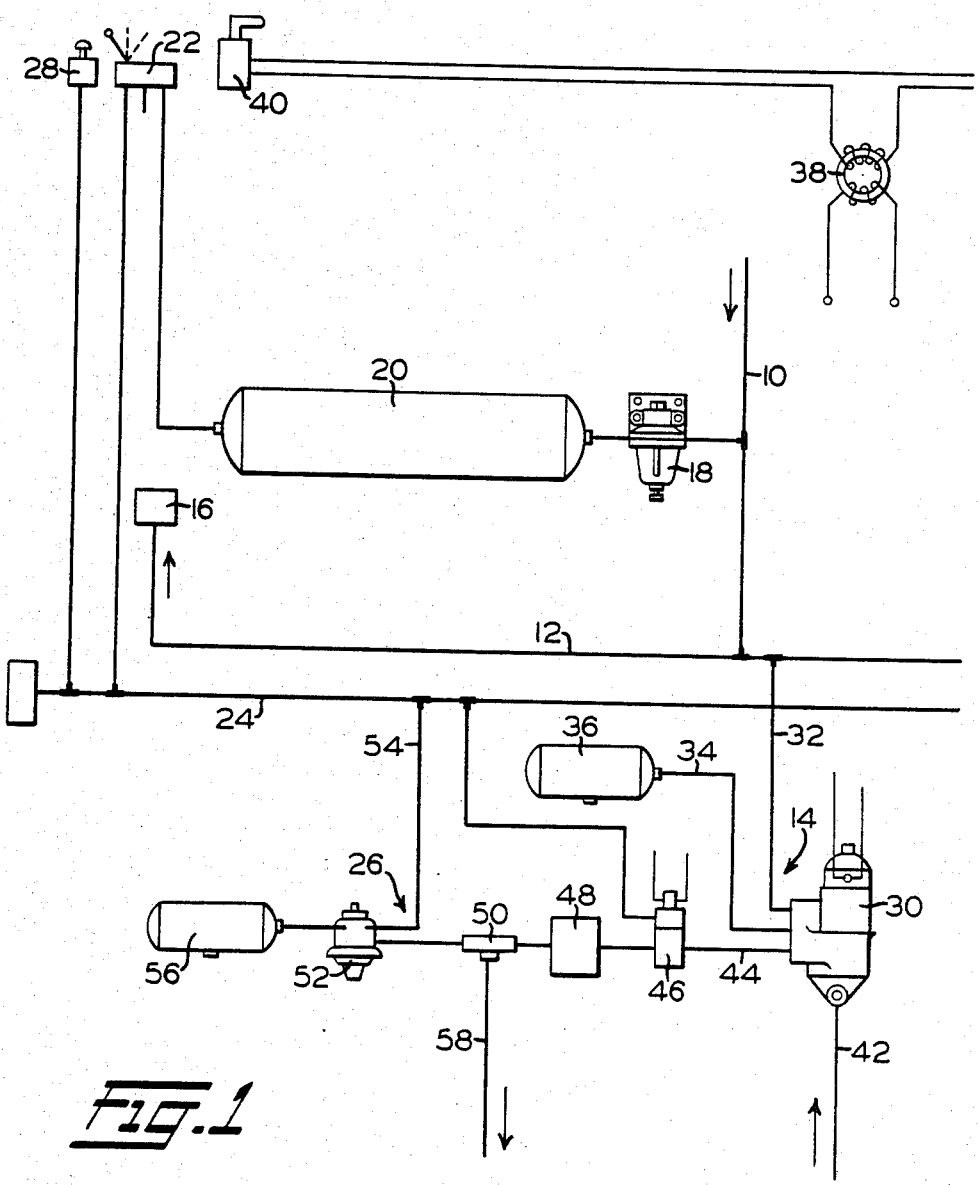
FIG. 1 shows schematically a brake system for equipment according to the invention.

In referring to the drawings, similar parts have been accorded similar numbers throughout the several views. In addition, as used in the specification and claims, the term vehicle refers to industrial vehicles having braking systems, as well as trains, and, in particular, passenger trains. The system will be described, however, as it would relate to a passenger train.

FIG. 1 illustrates the part of a brake system to be installed on an electric public transportation train, with two control cabs, one at the front and the other at the back. The part of the circuit shown in FIG. 1 corresponds to the part associated with one of the two control cabs, and the part corresponding to the other cab is identical.

Essentially, the system includes, as it is evident, a fluid supply line 10 connected on one side to a source of pressurized fluid which in the embodiment to be described is compressed air supplied from an air compressor (not shown) and on the other side to a main line 12. Line 12 is then connected to a service electropneumatic brake circuit, generally indicated with 14, and with various auxiliary services of the rail vehicle, as for example, auxiliary storage tanks, generally indicated with 16. Supply line 10 is also connected, through a pressure regulator 18, to a storage tank 20 which supplies, through a reset valve 22, a main line 24 which, in turn, is connected to a pneumatic pressure controlled brake means, indicated by 26. The fluid pressure controlled brake means 26 can be used as the emergency braking system. An emergency valve 28 is also connected to main line 24 through which it is possible to obtain an internal pressure drop in main line 24.

The electropneumatic service brake circuit 14 includes an electropneumatic transducer 30, of a known type, with a main pressure entry connected to main line 12 by line 32, and a secondary pressure entry connected through line 34 to a compressed air tank 36. The electropneumatic transducer 30 is electrically controlled, through an impedance adapter 38, from a manual electric control unit 40. As is known, the pressure value transmitted from transducer 30 is inversely proportional to the value of its supplied current; therefore, that pressure value is maximum in the absence of current.

In the presently preferred practice of the invention, the electropneumatic transducer 30 is provided with an exit connected by line 42 to a pneumatic suspension system of the vehicle (not shown), and with a second exit connected by line 44, through an interlocking or compensating electrovalve 46 and a release and lock device 48, to a first entry side of an automatic selector valve means 50.

Figure 2:
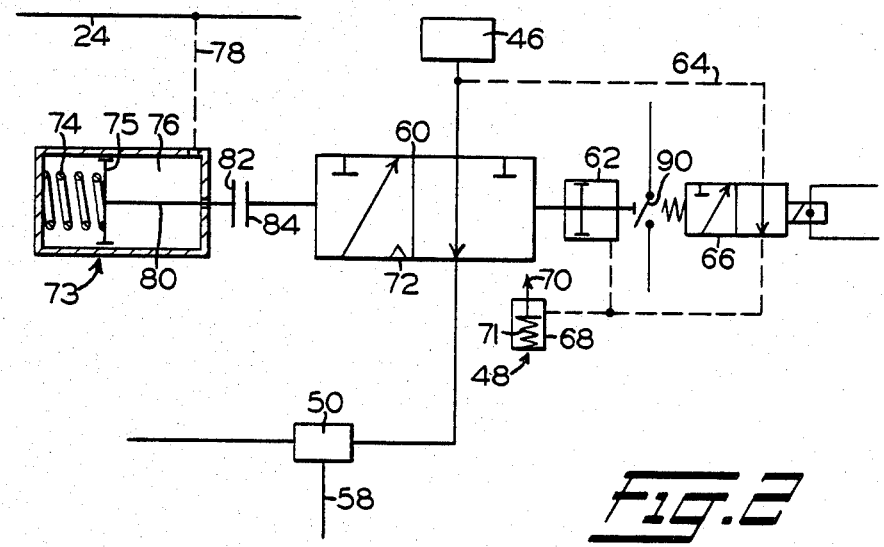
FIG. 2 is a schematic diagram which shows the release and lock device included in the system according to the invention.

The pneumatic pressure controlled brake equipment 26 includes a distributor valve 52 controlled through line 54 from main line 24. The entry of valve 52 is connected to a compressed air tank 56, while its exit is connected to a secondary entry of the automatic selector valve means 50. The exit of the automatic selecting valve means 50 is connected, through brake line 58, to the brake cylinders of the vehicle (not shown). As illustrated in the details of FIG. 2, the release and lock device 48 includes a two-way, two-position directional valve 60 which has the entry connected to the exit of the interlocking electrovalve 46, and the exit connected through automatic selecting valve means 50, to brake line 58. This valve 60 can be shifted from the open position, shown in FIG. 2, in which the connection between the interlocking valve 46 and the automatic selecting valve means 50 is open; to a closed position, wherein the connection is closed and the brake line 58 is in the release position. During operation of the system when an electrical signal is present in the electropneumatic portion 14 equal to or greater than a minimum predetermined value, valve 60 is kept in the open position. This is accomplished through the action of a pneumatic cylinder 62 which has the pressure chamber supplied by a line 64, from line 44 upstream of valve 60, through a two-way, two-position directional electrovalve 66. When energized, electrovalve 66 is generally in the open position, illustrated in FIG. 2, in order to keep the connection open between line 44 and the pressure chamber of the pneumatic cylinder 62, thus keeping valve 60 in the open position. When not energized, or when the electrical signal is less than the minimum predetermined value which in the presently preferred embodiment is substantially zero, electrovalve 66 shifts to the closed position. This allows releasing the pressure from the chamber of pneumatic cylinder 62 and allows valve 60 to return to the closed and release position.

An actuator 68 is connected to a stop mechanism 70 movable between an "in" rest position and an "out" operating position. In the operating position, the mechanism can work together with a matching notch 72 of valve 60, when this is in the closed or release position. The function of the stop mechanism 70 is to lock and maintain stable valve 60 in the closed and release position, as will be explained hereinafter.

In FIG. 2, the actuator 68 is pneumatic and it is connected, as shown, to the exit of electrovalve 66. Therefore, when electrovalve 66 is in the energized open position, the stop mechanism 70 is in the "in" rest position, against the action of a contrast spring 71. When electrovalve 66 is deenergized and shifts to the closed position, the pneumatic actuator 68 is in the release position and spring 71 moves the stop mechanism 70 into the operating, or "out" position.

Figure 3:
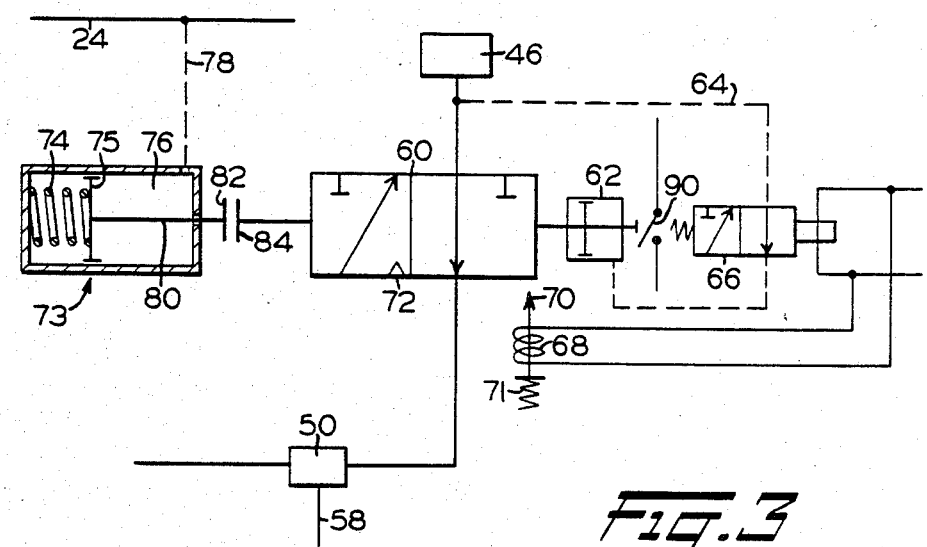
FIG. 3 is an alternative schematic diagram of the invention shown in FIG. 2.

In the variation shown in FIG. 3, in which identical or similar parts to the ones previously described are indicated with the same reference numbers, actuator 68 is electropneumatic and it is electrically connected to the energized circuit of the electrovalve 66. The stop mechanism 70, in this instance, works in the same way described above. Device 48 also includes a pneumatic cylinder 73 which is placed, with respect to valve 60, opposite to pneumatic cylinder 62. Inside cylinder 73, there is piston 75 which on one side is subjected to the action of a helicoidal spring 74 which tends to push it in the direction of valve 60; and on the other side, limited by pressure chamber 76, which, in the illustrated example, is connected to main line 24 through line 78. An axial shaft 80 is connected to piston 75 and has a thrust plate 82 able to work together with a thrust plate 84 connected to valve 60. In the presence of pressure in chamber 76, piston 75 is placed in the return position, illustrated in FIGS. 2 and 3, against the action of the spring 74. This eliminates any interference between plate 82 and plate 84. In case of a pressure decrease of sufficient magnitude in chamber 76, spring 74 causes piston 75 to shift to the right with respect to the Figures; therefore, plate 82 is pushed against plate 84 as described below.

As an alternative embodiment, the pneumatic cylinder 73 could be connected on an auxiliary tank under pressure instead of to main line 24. In the same manner, the pneumatic cylinder 62 and actuator supply 68, if this is pneumatic, can be performed by auxiliary compressed air tanks instead of line 44.

The general operation of the brake system is known and the related description is therefore omitted. During normal operation of the system, the release and lock device 48 is inactive, as shown in the illustrated configuration of FIG. 2 or FIG. 3. In this condition, electrical signals equal to or greater than a predetermined minimum value and the braking pressure coming from the electropneumatic transducer 30 can freely reach the brake line 58 and, therefore, the brake cylinders of the equipment.

In the case where the electrical signal is less than the predetermined minimum value which, for example only, may be the result of a breakdown or partial or total electrical failure of the system which, consequently, will automatically activate the automatic electropneumatic brake means 14 and, therefore, the activation of the brakes of the equipment. In this case, the release and lock device 48 allows brake line 58 to open and, therefore, to release the brakes of the equipment and permanent isolation of electropneumatic transducer 30 with respect to brake line 58, allowing the operation of the equipment and the use of fluid pressure controlled pneumatic braking equipment 26. In fact, in this instance, electrovalve 66 is deenergized and, therefore, in the closed position, putting the pneumatic cylinder 62 in the open position and causing the stop mechanism 70 to advance. In this manner, valve 60, which, in the normal condition was kept in the open position, is free to shift to the closed and release position. To obtain this shifting, it is enough to cause a fall of the pressure inside chamber 76 of the pneumatic cylinder 73 by acting, for example, on emergency valve 28 or on an auxiliary release valve connected to the main line 24.

In this manner, the piston 75, under the action of spring 74 causes, through the plates 82 and 84, the shifting of valve 60 to its closed position and the subsequent action of the stop mechanism 70 in matching notch 72. Therefore, the connection between the electropneumatic transducer 30 and the brake line 58 is permanently interrupted, and the line is placed in the release position so as to disconnect the brakes of the vehicle. The action of stop mechanism 70 allows valve 60 to stabilize in the closed position, independent of the return of piston 75 in the reset position due to a return of pressure inside main rake pipe line 24.

Optionally, an electric switch 90, connected to an individual optic and/or sound signaling circuit and, perhaps, operated by the piston of cylinder 62, may be provided to alert the operator of the equipment of the activation of device 48 with the closing of valve 60.

It is evident that the restoration of the electropneumatic brake circuit 14, following the restoration of an electrical signal above the predetermined minimum value, happens in a completely automatic way; this occurs when electrovalve 66 is energized and, consequently, the stop mechanism 70 returns to its resting position, allowing valve 60 to return to the open position by the action of cylinder 62 when the brakes applied by the fluid pressure controlled braking means 26 are in a release position.

While various presently preferred and alternative embodiments have been described, it should be obvious to those skilled in the art that other modifications can be made without departing from the spirit and scope of the appended claims.

I claim:

1. An improved vehicle braking apparatus that allows the vehicle brakes to resume operation when the magnitude of an electrical signal to an electro-fluidic portion of said braking apparatus is less than a predetermined minimum value, said braking apparatus comprising:

(a) a fluid pressure controlled braking means for supplying a first pressurized fluid in response to a pressure differential between a brake pipe and said fluid pressure controlled braking means;

(b) an automatic selector valve means for supplying pressurized fluid to said brakes of said vehicle, said automatic selector valve means having at least one fluid entry port connected to said fluid pressure controlled braking means to selectively receive said first pressurized fluid;

(c) an electro-fluidic braking means for supplying a second pressurized fluid in response to an electrical signal;

(d) a release means having at least one fluid entry port connected to said electro-fluidic braking means to receive said second pressurized fluid, said release means communicating said second pressurized fluid to said automatic selector valve means, said release means for isolating said electro-fluidic braking means from said automatic selector valve means and venting at least a portion of said second pressurized fluid when said electrical signal to said electro-fluidic braking means is less than said predetermined minimum value and when a pressure reduction in said brake pipe of said fluid pressure controlled braking means occurs thereby allowing release of said brakes of said vehicle and the resumption of operation under control of said fluid pressure controlled braking means.

2. An improved vehicle braking apparatus, according to claim 1, wherein said vehicle braking apparatus is pneumatic and includes an air source for supplying air to said fluid pressure controlled braking means and to said electro-fluidic braking means.

3. An improved vehicle braking apparatus, according to claim 2, wherein said release means comprises:

(a) a first valve means for controlling fluid communication between said electropneumatic braking means and said automatic selector valve means so that when said electrical signal is equal to or greater than said predetermined minimum value, said fluid communication is maintained open and when said electrical signal is less than said predetermined minimum value, said fluid communication is closed;

(b) a second means, connected to said first valve means, for urging said first valve means open when said electrical signal is equal to or greater than said predetermined minimum value and for allowing said first valve means to shift into a closed position when said electrical signal is less than said predetermined minimum value; and (c) a third means, connected to said first valve means, for urging said first valve means into said closed position when fluid pressure in said brake pipe is reduced to a predetermined minimum value.

4. An improved vehicle braking apparatus, according to claim 3, wherein said first valve means is a two-way, two-position directional valve having the fluid entry side connected to receive said fluid from said electropneumatic braking means and the fluid exit side connected to deliver said fluid to said automatic selector valve means.

5. An improved vehicle braking apparatus, according to claim 4, wherein said second means comprises:

(a) a pneumatic cylinder connected to said two-way, two-position directional valve so that when fluid pressure is supplied to the pressure chamber of said pneumatic cylinder, said two-way, two-position directional valve will be urged in said open position; and (b) a two-way, two-position directional electropneumatic valve connected to said pneumatic cylinder to supply said second fluid pressure to said pressure chamber when said electrical signal to said electropneumatic valve is equal to or greater than said predetermined minimum value and to vent said second fluid pressure from said pneumatic cylinder when said electrical signal is less than said predetermined minimum value.

6. An improved vehicle braking apparatus, according to claim 5, wherein said third means is a second pneumatic cylinder.

7. An improved vehicle braking apparatus, according to claim 6, wherein said second pneumatic cylinder is connected to an auxiliary reservoir.

8. An improved vehicle braking apparatus, according to claim 4, wherein said braking apparatus further comprises an interlocking electrovalve connected intermediate said electropneumatic braking means and said two-way, two-position directional electrovalve.

9. An improved vehicle braking apparatus, according to claim 4, wherein said release means further comprises a means for locking said two-way, two-position directional valve in said closed position.

10. An improved vehicle braking apparatus, according to claim 9, wherein said means for locking said two-way, two-position directional valve in said closed position is pneumatically operated and is supplied with pressurized fluid from said two-way, two-position directional electropneumatic valve.

11. An improved vehicle braking apparatus, according to claim 9, wherein said means for locking said two-way, two-position directional valve in said closed position is electropneumatic and is electrically connected to said two-way, two-position directional electropneumatic valve.

12. An improved vehicle braking apparatus, according to claim 3, wherein said electrical signal is such that the desired braking effect is inversely proportional to the amount of current supplied and said predetermined minimum value is substantially zero.

13. An improved vehicle braking apparatus, according to claim 3, wherein said braking apparatus further comprises a means for electrically signalling the activation of said release means.

14. A method of operating the brakes of a vehicle equipped with fluid pressure controlled braking equipment and electro-fluidic braking equipment, each of which alternately supplies pressurized fluid through an automatic selector valve means to operate said brakes of said vehicle, said method comprising the steps of:

(a) supplying a first pressurized fluid through said automatic selector valve means to said brakes on said vehicle in response to pressure differential between a brake pipe and said fluid pressure controlled braking equipment;

(b) supplying a second pressurized fluid through said automatic selector valve means to said brakes on said vehicle in response to an electrical signal to said electro-fluidic braking equipment;

(c) applying and releasing said brakes on said vehicle with said second pressurized fluid in response to said electrical signal having predetermined values;

(d) applying said brakes with said second pressurized fluid when said electrical signal in step (c) is less than a predetermined minimum value;
(e) isolating said electro-fluidic braking equipment from said automatic selector valve means and venting at least a portion of said second pressurized fluid in response to a reduction of pressure in said brake pipe while said signal is less than said predetermined minimum value; and
(f) applying and releasing said brakes on said vehicle thereafter under the control of said fluid pressure controlled braking equipment.

15. A method of operating the brakes of a vehicle, according to claim 14, further comprising when said electrical signal in step (d) is increased above said predetermined minimum value during a brake release in step (f) then removing said electro-fluidic braking equipment from isolation with said automatic selector valve means and ceasing the venting of said second pressurized fluid thereby establishing fluid communication of said second pressurized fluid to said automatic selector valve means.

16. A method of operating the brakes of a vehicle, according to claim 15, wherein said electrical signal is such that the desired braking effect is inversely proportional to the amount of current supplied and said predetermined minimum value is substantially zero.

* * * * *